United States Patent [19]
Berg et al.

[11] Patent Number: 5,267,283
[45] Date of Patent: Nov. 30, 1993

[54] NUCLEAR REACTOR

[75] Inventors: Diethart Berg, Herten-Westerholt; Wolfgang Riedel, Laudenbach, both of Fed. Rep. of Germany

[73] Assignee: RWE Energie Aktiengesellschaft, Essen, Fed. Rep. of Germany

[21] Appl. No.: 860,670

[22] Filed: Mar. 30, 1992

[30] Foreign Application Priority Data

Apr. 3, 1991 [DE] Fed. Rep. of Germany ....... 4110680

[51] Int. Cl.⁵ ............................................ G21C 19/42
[52] U.S. Cl. ................... 376/314; 376/313; 376/310; 376/316
[58] Field of Search ............. 376/314, 313, 309, 316, 376/283, 310; 976/DIG. 140, DIG. 378; 55/DIG. 9; 261/DIG. 54

[56] References Cited

U.S. PATENT DOCUMENTS

| 3,964,887 | 6/1976 | Hickey et al. | 55/267 |
| 4,081,323 | 3/1978 | Gans, Jr. et al. | 376/293 |
| 4,865,803 | 9/1989 | Dillmann et al. | 376/314 |
| 5,078,960 | 1/1992 | Berg et al. | 376/314 |

FOREIGN PATENT DOCUMENTS

| 3635342A1 | 4/1988 | Fed. Rep. of Germany . |
| 3806872A1 | 7/1989 | Fed. Rep. of Germany . |
| 3824606A1 | 1/1990 | Fed. Rep. of Germany . |

OTHER PUBLICATIONS

W. K. E. Braun et al., "The Reactor Containment of Standard-Design German Pressurized Water Reactors"; Nuclear Technology; 1986; pp. 268–290.

WHY EdF is Installing Filter Vented Containment by Delalande, Electricite de France, Mar. 1987, (pp. 33–38).

*Primary Examiner*—Donald P. Walsh
*Assistant Examiner*—Meena Chelliah
*Attorney, Agent, or Firm*—Herbert Dubno

[57] ABSTRACT

In addition to the metal-fiber filter and molecular sieve of a depressurization system for the containment vessel of a nuclear reactor, within an auxiliary equipment building adjacent the structure surrounding the containment vessel, at least one metal-fiber filter and at least one molecular sieve form filter elements of a system for evacuating the space between the structure and the containment.

5 Claims, 2 Drawing Sheets

5,267,283

NUCLEAR REACTOR

FIELD OF THE INVENTION

Our present invention relates to a nuclear reactor and, more particularly, to a filter system for a nuclear reactor which comprises, around the nuclear reactor core, a containment and around the containment, a structure which defines an annular space with the containment, an auxiliary building adjacent this structure and a stack for venting into the atmosphere.

BACKGROUND OF THE INVENTION

It is a common practice to provide a nuclear reactor so that the reactor safety vessel or containment is itself surrounded by a structure so that an annular compartment, chamber or space is defined between that structure and the containment, substantially all around the latter. An auxiliary equipment building can be provided adjacent this structure and the venting system can also include a stack or chimney for venting gases into the atmosphere. In general, a nuclear reactor of this type comprises a system for the depressurization of the containment as well as a system for maintaining a subatmospheric pressure, upon the occurrence of an event indicating a failure and which is provided with at least one blower connected to the stack or chimney.

In the past it has been customary, in addition, to provide the system for pressure relief of the containment with at least one metal-fiber filter and at least one molecular sieve downstream thereof.

The nuclear reactors to which these principles are applicable include pressurized-water reactors, boiling-water reactors and reactors of other types.

In general, the metal-fiber filter is provided within the containment vessel while the molecular sieve is provided in the auxiliary equipment building. It is, however, also possible to provide the metal-fiber filter in the auxiliary equipment building. An emergency filter which comes into play upon the occurrence of a failure of an "event" as described above, can also be provided in the auxiliary equipment building or at least in part in the annular space between the outer structure and the containment vessel.

The "failure" or "emergency" with which the invention is concerned is a so-called design failure in which radioactive substances may be liberated. The term, however, does not normally include so-called design-exceeding events which may involve melting of the core, i.e. a fuel or limited meltdown.

In design failures as well as with design-exceeding events involving melting of the core, radioactive substances are released by leakage processes from the containment vessel into the annular space. Prevailing viewpoints in the field of nuclear safety design the system for use of the emergency filter in the case of design failures. The design failures, however, release relatively small amounts of radioactivity by comparison to the design-exceeding events involving core melting In the nuclear reactor system over which the invention is considered to be an improvement, the emergency filter is formed by at least one suspended-material filter, at least one active-coal filter and, optionally, at least one further suspended-matter filter downstream of the active-carbon filter.

The materials from which these filters are constructed are cellulosic fleeces, paper, coal and the like.

While these earlier system have been found to be satisfactory in most cases, they are not suitable for design-exceeding events involving melting of the core when one must maintain a suction action capable of removing radioactive components entering the space from the moment at which a melting of the core commences through depressurization and over the entire superatmospheric pressure phase in the safety vessel. In those situations, special and more complex means must be provided.

OBJECTS OF THE INVENTION

It is, therefore, the principal object of the present invention to provide a nuclear reactor of the type described above which has a simplified construction of the system for emergency maintenance of a subatmospheric pressure in the annular space so that the system can more adequately function during design-exceeding events involving core melting from the beginning of core melting, through depressurization of the containment vessel and thereafter during the entire emergency for which there is a superatmospheric pressure phase within the containment.

More particularly, it is an object of the invention to provide a nuclear reactor having both a containment vessel depressurization system and a system for generating a subatmospheric pressure in the surrounding space whereby that latter system can remain operational and effective for very long periods of time.

Another object of the invention is to provide a nuclear reactor whereby drawbacks of earlier systems are avoided, and especially, the disadvantage of limited useful life of any system for evacuating the space surrounding the containment is obviated.

SUMMARY OF THE INVENTION

These objects and others which will become apparent hereinafter are attained, in accordance with the invention, by providing the emergency filter from at least one metal-fiber filter and at least one molecular sieve downstream of the metal-fiber filter. Preferably, the metal-fiber filter and the molecular sieve downstream thereof and forming therewith the emergency filter, are provided in cascade with at least one suspended-matter filter and at last one active-carbon filter downstream of the emergency filter.

Depending upon the capacity requirements of the individual filter assemblies and also for redundancy, pluralities of these filters, each having a metal-fiber filter and molecular sieve, can be provided in parallel or in series.

As need requires, filter assemblies with metal-fiber filters, prefilters, molecular sieves, suspended-matter filters and active-coal filters can be connected in parallel and connected in the path between the stack and the space to be evacuated in series with one or more blowers in any combination.

More specifically, a nuclear reactor according to the invention can comprise:
  a nuclear reactor core;
  a containment surrounding the core;
  a structure spacedly surrounding the containment and defining an annular space therewith into which radiation can leak upon a core-melt design-exceeding nuclear event;
  an auxiliary equipment building adjacent the structure;

a depressurization system connected to an interior of the containment for depressurizing same, the system comprising:
  at least one metal-fiber filter communicating with the interior of the containment,
  at least one molecular sieve downstream of the metal-fiber filter and connected therewith, and
  an exhaust stack for discharging waste gas into the atmosphere connected to the molecular sieve; and
an emergency evacuation system connected to the space for evacuating same upon the occurrence of a core-melt design-exceeding nuclear event and maintaining a subatmospheric pressure in the space, the emergency-evacuation system including:
  at least one other metal-fiber filter connected to the space,
  at least one other molecular sieve connected to the other metal-fiber filter and downstream thereof, and
  at least one blower for generating the subatmospheric pressure in the space connected between the other molecular sieve and the stack.

According to the invention, the metal-fiber filter and molecular sieve which hitherto have been employed only in the pressure-relief system for the containment, are incorporated in the system for emergency evacuation of the space surrounding the containment and for maintaining a subatmospheric pressure therein and thus are used for a new purpose, namely, for design-exceeding events involving core melting.

Surprisingly, through the use of such filters, we are able to maintain the effectiveness of the latter system upon the development of a design-exceeding event involving core melting by evacuating radioactivity from the annular space through the pressure relief of the containment for the length of time sufficient to meet the duration for which the superatmospheric pressure is sustained in the containment.

Both the metal-fiber filter and the molecular sieve of the pressure-relief system and the system for emergency evacuation of the space can be formed as the modular unit and can be identical for both systems so that they are interchangeable.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
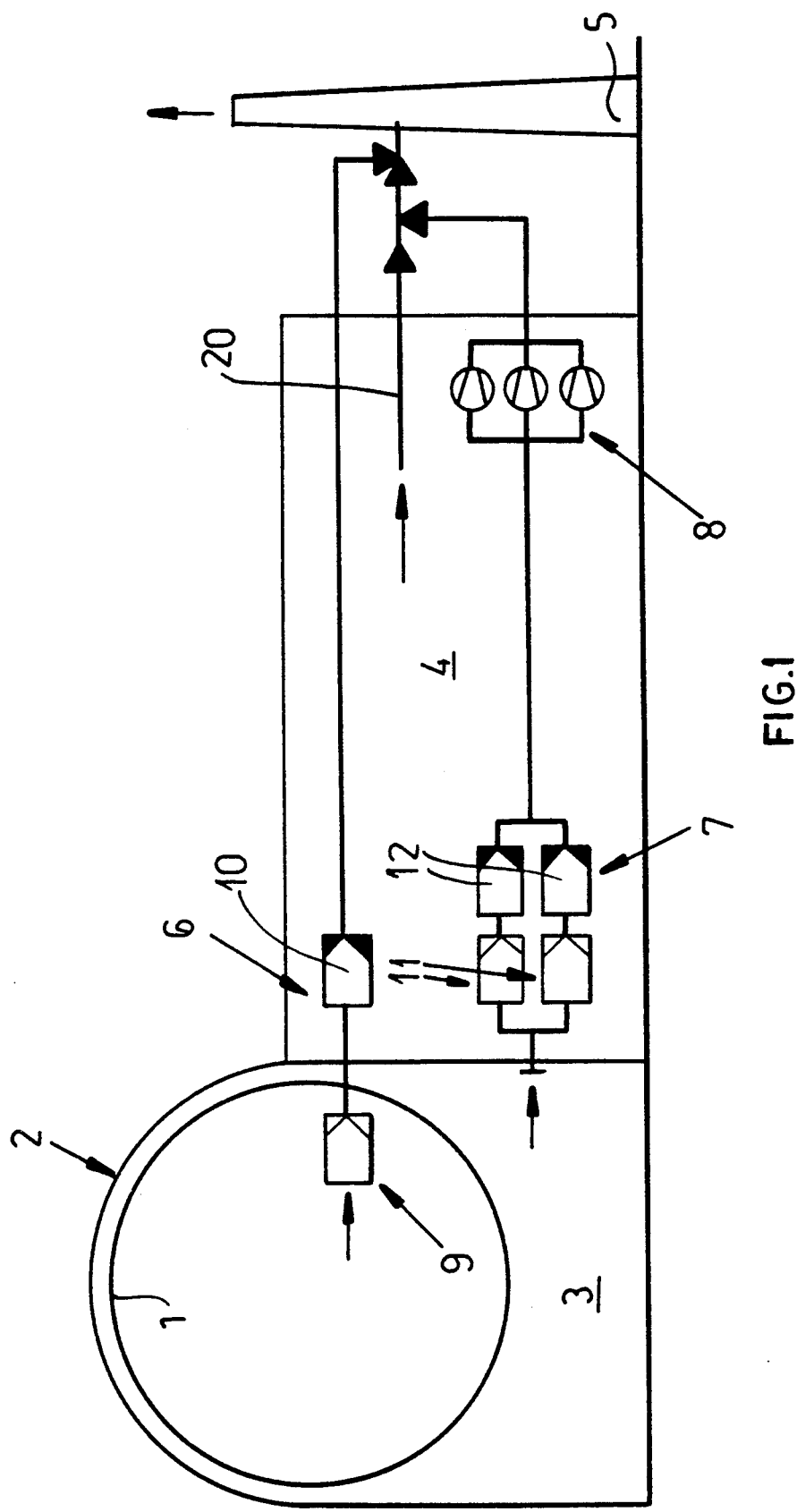
FIG. 1 is a diagram of the nuclear reactor according to one embodiment of the invention.
Figure 2:
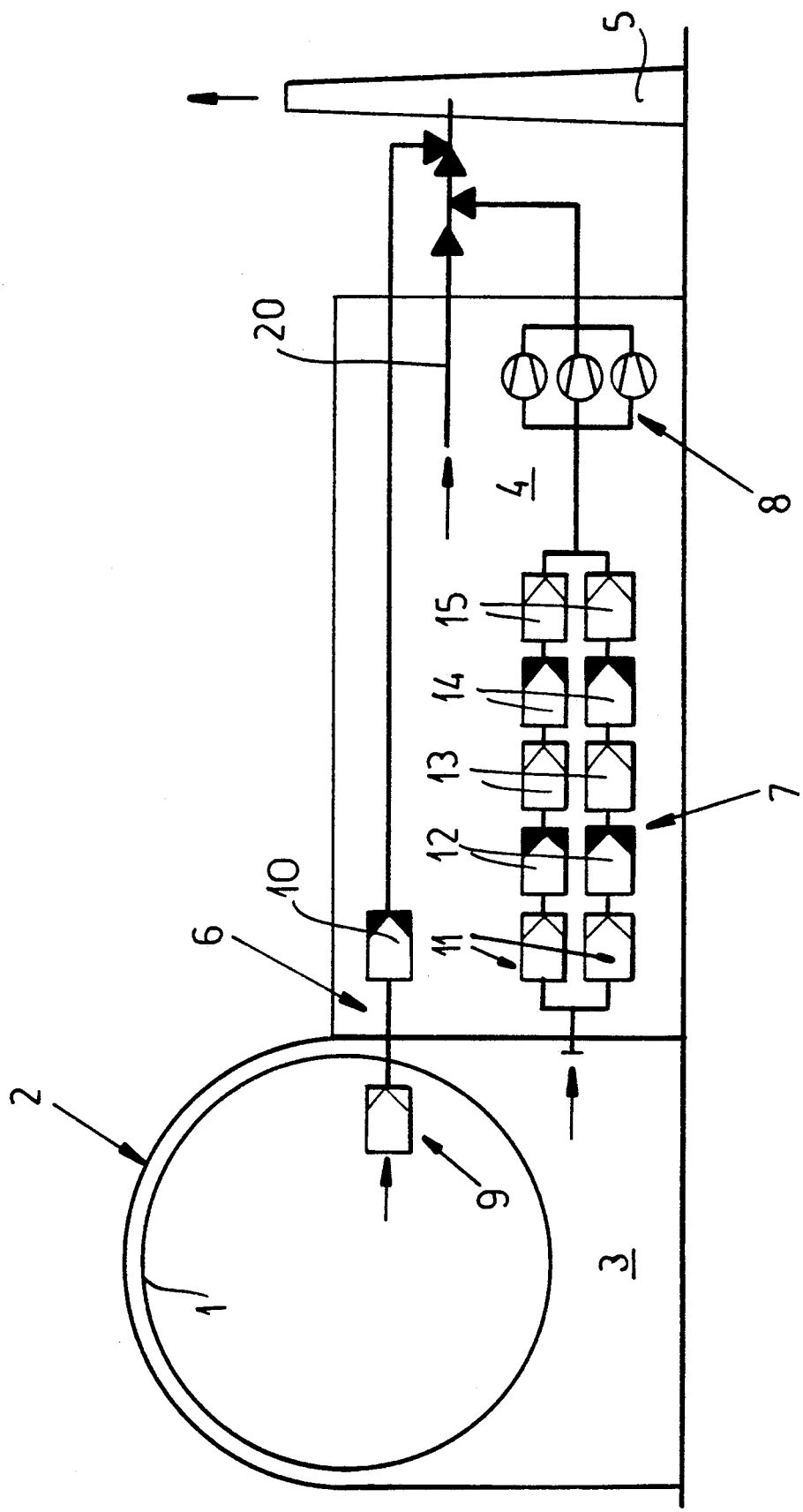
FIG. 2 is a diagram of a nuclear reactor according to a second embodiment of the invention.

In FIGS. 1 and 2 of the drawing, we have shown a reactor containment vessel 1 enclosing the reactor core of a boiling-water reactor, for example, which is surrounded by an annular structure 2 to define an annular space 3 extending substantially all around the containment. Adjacent the structure 2 is an auxiliary apparatus building 4 and, spaced from the latter, a chimney or stack 5 opening into the atmosphere.

Both in the embodiment of FIG. 1 and in the embodiment of FIG. 2, a system 6 is provided for depressurization of the containment vessel 1.

In addition, a system 7 is provided for the emergency evacuation of the space 3 and for maintaining a subatmospheric pressure therein in the case of design-exceeding events involving melting of the core.

The latter system 7 comprises a blower system 8 which may include a plurality of parallel blowers for redundancy purposes or to generate the necessary evacuation flow, these blowers discharging into the chimney or stack 5.

As represented by the line 20, the atmosphere wherein building 4 is also vented through the stack 5. The various lines and flow directions carrying the discharge gases to the stack are shown in heavy lines and with arrows.

The pressure-relief system 6, for venting the pressure in the containment 1, comprises a metal-fiber filter 9 and a molecular sieve 10 downstream thereof, the molecular sieve trapping any radioactive gases, such as fission products, which may pass the metal-fiber filter.

The emergency filter of the evacuation system 7 also includes metal-fiber filters 11 and molecular sieves 12 downstream thereof as can be seen from FIG. 1.

In the embodiment of FIG. 2, an emergency filter comprises not only the metal-fiber filter 11 and the molecular sieve 12 downstream thereof, but a suspended-matter filter 13 and an active-coal filter 12 in succession.

In both embodiments, pluralities of the filter assemblies 11, 12 or 11, 12, 13, 14 are connected in parallel. In the embodiment of FIG. 2, moreover, at the downstream side of each filter assembly, a further suspended-matter filter 15 is provided.

The filter capacities of the aerosol filters 11, 13, 15 can be stepped.

In the embodiments of FIGS. 1 and 2, in which both systems 6 and 7 have metal-fiber filters and molecular sieves, these can be provided as modular units which can be interchanged for the two systems and provided in as great or small a number as required. The filter units can include other components such as missed separators, droplet separators and heaters as the design requirements dictate.

We claim:

1. A nuclear reactor, comprising:
  a nuclear reactor core;
  a containment surrounding said core;
  a structure spacedly surrounding said containment and defining an annular space therewith into which radiation can leak upon a core-melt design-exceeding nuclear event;
  an auxiliary equipment building adjacent said structure;
  a depressurization system connected to an interior of said containment for depressurizing same, said system comprising:
    at least one metal fiber filter communicating with said interior of said containment,
    at least one molecular sieve downstream of said metal fiber filter and connected therewith, and
    an exhaust stack for discharging waste gas into the atmosphere connected to said molecular sieve; and
  an emergency evacuation system connected to said space for evacuating same upon the occurrence of a core-melt design-exceeding nuclear event and maintaining a subatmospheric pressure in said space, said emergency evacuation system including:

at least one other metal fiber filter connected to said space, at least one other molecular sieve connected to said other metal fiber filter and downstream thereof, and at least one blower for generating said subatmospheric pressure in said space connected between said other molecular sieve and said stack.

2. The nuclear reactor defined in claim 1 wherein said emergency evacuation system includes:

at least one suspended-matter filter connected downstream of said other molecular sieve and upstream of said blower; and at least one active coal filter connected downstream of said other molecular sieve and upstream of said blower.

3. The nuclear reactor defined in claim 1 wherein said emergency evacuation system includes:

a plurality of assemblies of at least one metal fiber filter and at least one molecular sieve in series, said assemblies being connected in parallel between said space and said blower.

4. The nuclear reactor defined in claim 1 wherein said emergency evacuation system includes:

a plurality of assemblies of at least one metal fiber filter, at least one molecular sieve, at least one suspended matter filter and at least one active coal filter in series, said assemblies being connected in parallel between said space and said blower.

5. The nuclear reactor defined in claim 1 wherein the metal fiber filters and molecular sieves of each of said systems form a modular component.

* * * * *